(12) United States Patent
Henderson et al.

(10) Patent No.: US 11,479,864 B2
(45) Date of Patent: Oct. 25, 2022

(54) CORROSION INHIBITION TREATMENT FOR AGGRESSIVE FLUIDS

(71) Applicant: CHEMTREAT, INC., Glen Allen, VA (US)

(72) Inventors: William Henderson, Midlothian, VA (US); Patrick Wood, Midlothian, VA (US)

(73) Assignee: CHEMTREAT, INC, Glen Allen, VA (US)

( * ) Notice: Subject to any disclaimer, the term of this patent is extended or adjusted under 35 U.S.C. 154(b) by 0 days.

(21) Appl. No.: 17/045,438

(22) PCT Filed: Apr. 4, 2019

(86) PCT No.: PCT/US2019/025740
§ 371 (c)(1),
(2) Date: Oct. 5, 2020

(87) PCT Pub. No.: WO2019/195523
PCT Pub. Date: Oct. 10, 2019

(65) Prior Publication Data
US 2021/0164112 A1 Jun. 3, 2021

Related U.S. Application Data

(60) Provisional application No. 62/652,604, filed on Apr. 4, 2018.

(51) Int. Cl.
C23F 11/14 (2006.01)
C23F 11/16 (2006.01)
C23F 11/167 (2006.01)
C23F 11/18 (2006.01)
C23F 11/10 (2006.01)

(52) U.S. Cl.
CPC .......... *C23F 11/1676* (2013.01); *C23F 11/10* (2013.01); *C23F 11/141* (2013.01); *C23F 11/142* (2013.01); *C23F 11/161* (2013.01); *C23F 11/18* (2013.01); *C23F 11/185* (2013.01)

(58) Field of Classification Search
CPC ........... C23F 11/08; C23F 11/10; C23F 11/14; C23F 11/141; C23F 11/142; C23F 11/143; C23F 11/149; C23F 11/16; C23F 11/161; C23F 11/167; C23F 11/1676; C23F 11/18; C23F 11/185; C02F 1/683; C02F 1/70; C02F 5/02; C02F 5/08; C02F 5/10; C02F 5/105; C02F 5/12; C02F 5/124; C02F 5/14; C02F 5/145; C02F 2303/08
See application file for complete search history.

(56) References Cited

U.S. PATENT DOCUMENTS

| | | | | |
|---|---|---|---|---|
| 3,418,254 A * | 12/1968 | Bishof | .................... | C23F 11/10 252/392 |
| 3,429,925 A | 2/1969 | Cour | | |
| 3,931,043 A * | 1/1976 | Walker | ................. | C23F 11/141 252/392 |
| 4,537,684 A * | 8/1985 | Gallup | ..................... | C02F 5/08 210/696 |
| 4,830,766 A * | 5/1989 | Gallup | ..................... | C02F 1/70 252/178 |
| 5,415,805 A * | 5/1995 | Brown | ..................... | C23F 11/08 252/392 |
| 5,916,484 A * | 6/1999 | Brezinski | ............... | C23F 11/04 252/391 |
| 6,001,156 A * | 12/1999 | Riggs, Jr. | ................ | C23F 11/08 106/14.15 |
| 6,192,987 B1 * | 2/2001 | Funkhouser | ............ | C09K 8/54 166/312 |
| 6,200,529 B1 * | 3/2001 | Riggs, Jr. | ................ | C02F 5/083 252/389.2 |
| 6,303,079 B1 * | 10/2001 | Meyer | ................... | C23F 11/149 252/390 |
| 7,910,024 B2 * | 3/2011 | Stapp | ...................... | C23F 11/08 252/389.22 |
| 9,290,849 B2 * | 3/2016 | Richardson | ............ | C02F 5/083 |
| 9,290,850 B2 * | 3/2016 | Erickson | ............... | C23F 11/187 |
| 9,492,790 B2 * | 11/2016 | Williams | ............... | C02F 1/441 |
| 10,174,429 B2 * | 1/2019 | Kalakodimi | ........... | C23F 11/08 |
| 2006/0118761 A1 | 6/2006 | Stapp | | |
| 2009/0069202 A1 | 3/2009 | Stapp et al. | | |
| 2010/0000851 A1 * | 1/2010 | Dole | ........................ | C02F 1/06 203/11 |
| 2015/0284859 A1 | 10/2015 | Erickson et al. | | |
| 2016/0215400 A1 * | 7/2016 | Kalakodimi | ............ | C23F 11/08 |
| 2017/0130340 A1 * | 5/2017 | Kalakodimi | ............ | C23F 11/08 |
| 2017/0182466 A1 * | 6/2017 | Basheer | ................... | C02F 1/32 |
| 2018/0030345 A1 * | 2/2018 | Gill | ....................... | C23F 11/173 |

OTHER PUBLICATIONS

International Searching Authority, Notification of Transmittal of the International Search Report and the Written Opinion of the International Searching Authority, or the Declaration, pp. 11, dated Jun. 21, 2019.

* cited by examiner

*Primary Examiner* — Matthew R Diaz
(74) *Attorney, Agent, or Firm* — Oliff PLC

(57) ABSTRACT

Methods and compositions for inhibiting corrosion of metal surfaces in aggressive fluids, including fluids with high total dissolved solids content. The treatment composition can include a stannous corrosion inhibitor and optionally an additive that enhances the corrosion inhibition properties of the stannous component. The additive may include organic compounds having at least one heteroatom.

22 Claims, 3 Drawing Sheets

CORROSION INHIBITION TREATMENT FOR AGGRESSIVE FLUIDS

TECHNICAL FIELD

This disclosure relates generally to corrosion inhibition treatments for aggressive fluids, and more particularly to fluids with an aqueous component that has a high total dissolved solids content ("TDS"). These types of fluids can be highly corrosive.

BACKGROUND

The costs associated with corrosion of metal equipment and conduits in the United States are estimated at approximately 1.1 trillion dollars annually. There are various methods of inhibiting corrosion including protective films, impressed current, sacrificial anodes, and chemical corrosion inhibitors. Many systems which carry fluids utilize chemical corrosion inhibitors, for example, cooling towers, oil and gas pipelines, boilers, geothermal wells, and many others. The type of corrosion inhibitor that is used is usually selected, is based on the aggressiveness of the environment towards corrosion and other considerations such as environmental concerns, temperature, and solubility of the treatment program.

Some sources of corrosion include:
Fluids containing gases including oxygen, hydrogen sulfide, and carbon dioxide;
High dissolved solids;
Acidic environments;
Elevated temperatures;
High flow rates of the fluid;
Organic and mineral deposits; and
Microbiological growth.

High TDS waters are found in geothermal and the oil and gas industry where produced water can contain over 300,000 ppm of dissolved solids. Some examples of TDS for various waters are listed the Table 1 below:

TABLE 1

| Body of Water | TDS (ppm) |
| --- | --- |
| Lake Superior | 63 |
| Mississippi River | 130-220 |
| Potable Water | <500 |
| Cooling Tower Blowdown | 500-1,500 |
| Seawater | 34,500-45,000 |
| Geothermal Wells | 6,000-300,000 |
| Produced Water | 10,000-400,000 |

In many cases, in addition to high TDS levels, aggressive fluids such as produced water and geothermal wells exist at elevated temperatures, have a low pH, and contain corrosive gases. Finding chemical corrosion inhibitors that are effective in these environments can be challenging. For example, corrosion inhibitor requirements may include high temperature stability, compatibility in high brine solutions, and effectiveness in the presence of corrosive gases. Additional concerns may include compatibility with fluids containing high levels of organic compounds, compatibility in the presence of multiphase fluids without creating emulsions, and solubility limitations due to the presence of dissolved ions.

Corrosion inhibitors used in water with a TDS over around 5,000 ppm currently include filming compounds such as dimer/trimer acid, imidazolines, BAP quats, quaternized fatty amines and ethoxylated fatty amines. These compounds form a protective layer at the metal surface to prevent corrosion. These compounds typically contain a polar head group and non-polar tail, and thus, many of these compounds are surfactants with water wetting or emulsifying properties. Compounds with a higher level of non-polar functionality tend to form more persistent films, however, suffer from decreased solubility in water and can create issues when formulating. These products utilize either batch treatment or continuous treatment. The cost of filmers vary, but most require reactions using refined chemicals.

Some other commonly used corrosion inhibitors include phosphate esters, zinc metal salts, neutralizing amines and oxygen scavengers. The performance of some of these corrosion inhibitors can be enhanced, e.g., (i) by neutralizing amines with acids including acetic acid, hydroxy acetic acid, or thiols (mercaptoethanol or thioglycolic acid) to reduce pH, or (ii) in the case of zinc, which has a unique mechanism of corrosion inhibition in which zinc precipitates to zinc oxide at high pH, forming zinc complexes with HEDP.

SUMMARY

According to one aspect, this disclosure provides a method of inhibiting corrosion of a corrodible metal surface that contacts a fluid having an aqueous component with a total dissolved solids content of at least 30,000 ppm. The method includes adding a a stannous compound to the fluid.

According to another aspect, this disclosure provides a corrosion inhibition composition that includes a stannous salt and an organic compound having at least one heteroatom. The organic compound can be provided in amounts relative to the stannous salt that are sufficient to improve corrosion inhibition of a steel surface as compared to the stannous salt alone.

BRIEF DESCRIPTION OF THE DRAWINGS

The manner in which the objectives of the present disclosure and other desirable characteristics may be obtained is explained in the following description and attached drawings in which.

DETAILED DESCRIPTION OF EMBODIMENTS

Figure 1:
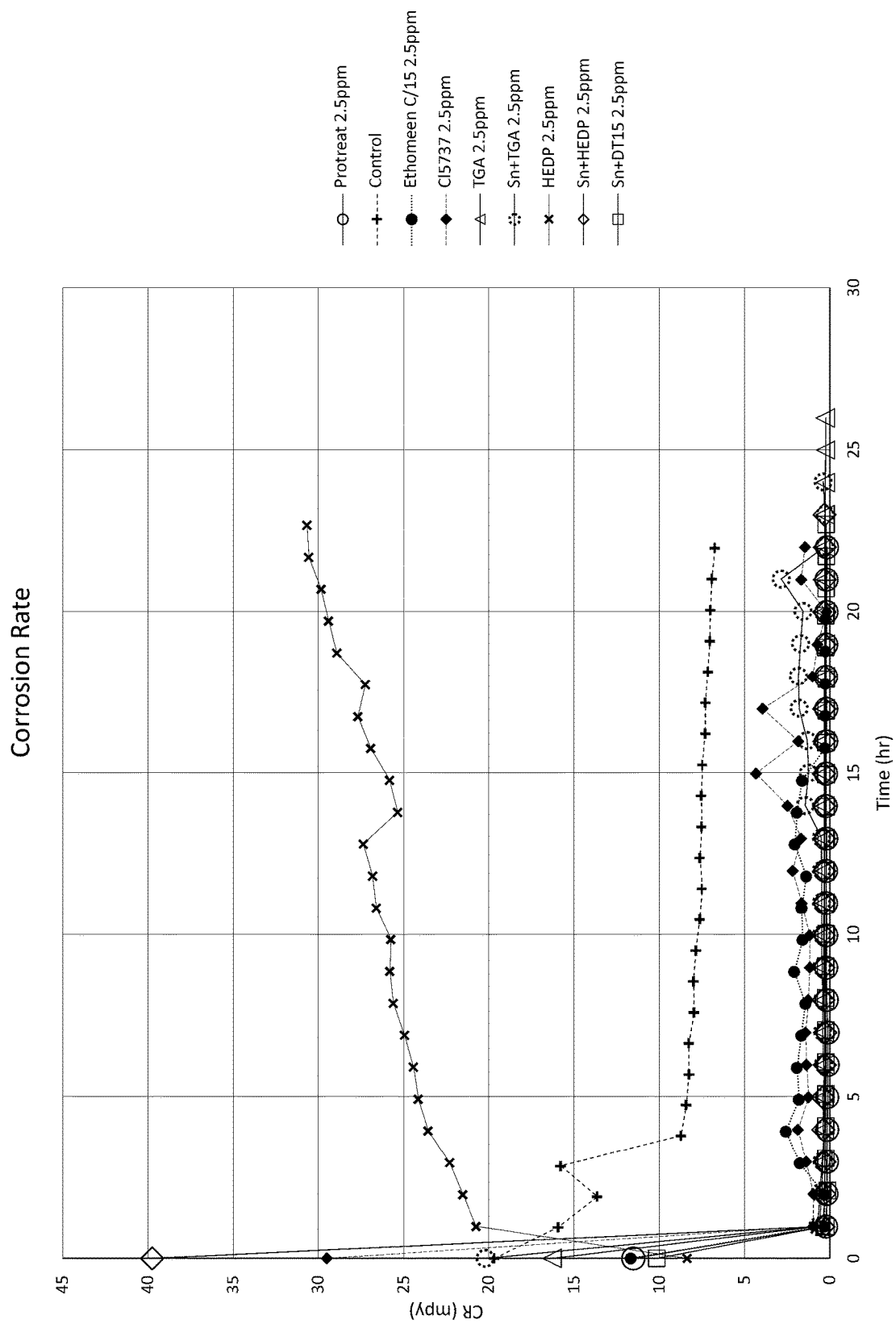
FIGS. 1-3 are graphs showing experimental results of a rotating cylinder electrode corrosion inhibition test for several treatment compositions.

In accordance with this disclosure, it has been discovered that the use of tin salts optionally in combination with synergistic additive compounds can provide exceptional corrosion inhibition to a corrodible metal surface that is in contact with aggressive fluids, including high TDS stressed conditions. The aggressive fluid can be a water-containing fluid having, for example, more than 10 wt. % water, more than 50 wt. % water, or more than 80 wt. % water. Examples of these types of aggressive fluids may include produced water in oil and gas applications, such as oilfield brines, water used in geothermal wells, mining waters and high temperature closed-loop systems, among others. In some cases, the fluid may exist as an emulsion or dispersion that includes a majority water aqueous component as either a disperse or continuous phase. In other cases, the fluid may exist as a single phase with an aqueous component.

The corrodible metal surfaces can include any metal surface that comes into contact with the aggressive fluid, including steel and iron surfaces that are present in equipment and conduits.

The treatment compositions and methods of this disclosure may be suitable to inhibit corrosion of aggressive fluids such as those having an aqueous component with a TDS of greater than 10,000 ppm, from 30,000 ppm to 500,000 ppm, from 50,000 ppm to 400,000 ppm, and from 100,000 ppm to 300,000 ppm. The fluids may have pH values in the range of 2 to 8, 3 to 7, or 4 to 6. The fluid may have a temperature in the range of from 20° C.-150° C. or 70° C.-100° C., which are typical of bottomhole temperatures, for example. Pipeline temperatures may be cooler, for example, about 5° C.-50° C.

Inorganic ions that may contribute to high TDS include chlorides, sulfates, phosphates, nitrates, fluorides, sodium, magnesium, calcium, sodium potassium. The aggressive fluids can have a Ca content of greater than 1,000 ppm, from 1,500 ppm to 100,000 ppm, and from 5,000 ppm to 50,000 ppm. The fluids can have a sulfate content of greater than 0 ppm, from 5 ppm to 50,000 ppm, and from 10 ppm to 500 ppm. The fluids can have a chloride content of greater than 10,000 ppm, from 15,000 ppm to 500,000 ppm, and from 50,000 ppm to 250,000 ppm.

The aggressive fluids can include gases such as oxygen (e.g., less than 1 ppm for anaerobic environments, and about 3 ppm to 14 ppm for aerobic environments), hydrogen sulfide (e.g., 0.001 to 20 wt. %), and carbon dioxide (e.g., 0.001 to 40 wt. %).

The effectiveness of traditional corrosion inhibitors in these types of fluids was evaluated in Tables 2 and 3 below. Table 2 is data taken under aerobic conditions and Table 3 is data taken under anaerobic conditions.

In both data sets C1010 mild steel coupons were immersed in a brine for 3 days and the weight loss of the coupons was analyzed to determine corrosion rates. The brine composition is:
a. 9.62 wt. % NaCl
b. 0.305 wt. % $CaCl_2 \times 2H_2O$
c. 0.186 wt. % $MgCl_2 \times 6\ H_2O$
d. 250 ppm $NaHCO_3$
e. balance water The brine had a TDS of approximately 100,000 ppm.

The Table 2 data is taken under aerobic conditions and was left open to the atmosphere, which would cause the brine to have about 2-15 ppm dissolved oxygen. The temperature of the brine was 25° C. and the pH of the brine was adjusted to 5.5 with HCl.

The Table 3 data is taken under anaerobic conditions in which the brine is bubbled with $CO_2$ for one hour and blanketed with $CO_2$ for the extent of the test to remove dissolved oxygen. The temperature of the brine was 40° C. and the pH was 5.

TABLE 2

Aerobic data for traditional corrosion inhibitors

| Product | Product ppm | Active ppm | % Inhibition |
|---|---|---|---|
| ADBAC Quat (50%) | 50 | 25 | 12.92 |
| ethoxylated coco amine | 50 | 50 | −21.39 |
| ethoxylated tallow diamine | 50 | 50 | −9.13 |
| TOFA Imidazoline DES Quat | 50 | 50 | 8.88 |
| TOFA Imidoamine DES Quat | 50 | 50 | 15.03 |
| Imidazoline Blend | 150 | 50 | 27.31 |
| Oleyl Sarcosine | 50 | 50 | 16.70 |
| Alkoxyated phosphate ester | 50 | 50 | −9.93 |
| Alkaneolamine borate ester | 100 | 50 | 6.36 |
| Alkyl polysacharide | 73.5 | 50 | 1.48 |
| Alkoxylated phosphate ester | 50 | 50 | −6.14 |

TABLE 2-continued

Aerobic data for traditional corrosion inhibitors

| Product | Product ppm | Active ppm | % Inhibition |
|---|---|---|---|
| Ethoxylated alkyl quat | 50 | 50 | −2.60 |
| Triethanolamine phosphate ester | 62.5 | 50 | −3.90 |
| quaternary amine derivative | 62.5 | 50 | 11.69 |
| Sodium Nitrite | 200 | 50 | −26.81 |
| BAP Quat with Morpholine | 150 | 45 | 18.01 |
| Neutralized TOFA Imidazoline 1 | 200 | 32.5 | 40.52 |
| Neutralized TOFA Imidazoline 2 | 200 | 50 | 3.60 |
| Neutralized TOFA Imidazoline 3 | 200 | 20 | 15.49 |

TABLE 3

Anaerobic data for traditional corrosion inhibitors

| Product | Product ppm | Δ (g) | Corrosion rate (mpy) | % Inhibition |
|---|---|---|---|---|
| Control | — | 0.0921 | 30.25733 | 0 |
| Control | — | 0.0915 | 30.06022 | 0.651466 |
| Pyridine Quat | 10 | 0.0468 | 15.37506 | 48.85246 |
| DDAC | 10 | 0.0575 | 18.8903 | 37.15847 |

It was discovered in connection with this invention that the use of tin salts, alone or in combination with synergistic additive compounds, can provide exceptional corrosion inhibition under high TDS stressed conditions. These tin corrosion inhibitor treatments surprisingly outperform conventional corrosion inhibitor treatments. This performance unexpected since Sn(II) corrosion inhibitors are typically limited to cooling water applications in low TDS waters. Additionally, as pH decreases and the concentration of chlorides, sulfates and calcium increase, the corrosion inhibition properties of Sn(II) based products are known to decrease.

Without intending to be bound by theory, it is believed that stannous compounds undergo oxidation at the vulnerable metal surfaces, or those surfaces in need of corrosion protection, and form a durable insoluble film that protects against corrosion. These metal surfaces can also react with the stannous compounds to form metal-tin complexes, which again form protective films on the metal surface. Stannous inhibitors applied in accordance with the disclosed methods appear to form a protective film on reactive metals by at least three possible mechanisms. A first mechanism involves forming an insoluble stannous hydroxide layer under alkaline conditions. This stannous hydroxide appears to oxidize further to form a stannate oxide layer, which is even more insoluble, resulting in a protective film which is resistant to dissolution from the surface even in the absence of stannous salts in the process water. A second mechanism may be achieved under acidic conditions or in the presence of surface oxidants, for example, ferric or cupric ions, whereby the stannous salts can be directly oxidized to highly insoluble stannate salts. These stannate salts then precipitate onto the metal surface to form a protective layer and provide the desired corrosion inhibition function. A third mechanism may be achieved under alkaline conditions whereby existing metal oxides are reduced to more stable reduced forms that incorporate insoluble stannate salts in a hybrid film.

The corrosion inhibitor treatment can include one or more stannous salts, for example, including those selected from the group consisting of stannous sulfate, stannous bromide, stannous chloride, stannous oxide, stannous phosphate, stannous pyrophosphate, stannous tetrafluoroborate, and combinations thereof.

Formulating the stannous treatment with a synergistic additive provides a corrosion treatment composition that outperforms a treatment using the same amount of the additive alone, as well as a treatment of the same amount of the tin salt alone without a synergistic additive.

Where the synergistic additive is used, it should be selected and used in amounts effective to improve the corrosion inhibition as compared to using the stannous compound alone. The additive can include or consist essentially of at least one organic compound that has at least one heteroatom, for example, a heteroatom of phosphorous, nitrogen, or sulfur. The organic additive may include thiols, phosphonates, amines (particularly ethoxylated amines), and combinations thereof, and more specifically may include one or more compounds selected from thioglycolic acid (TGA), mercaptoethanol, decanethiol, aminotrimethylenephosphonate, 2-phosphonobutane-1,2,4,-tricarboxylic acid (PBTC), aminomethylenephosphonates, PAPEMP, diethylenetriamine penta (methylene phosphonic acid) (DETPMP), bis(hexamethylene triamine penta (methylene phosphonic acid) (BHMTPMP), substituted imidazoline, pyridine quat, ethoxylated alkylamine, aminopropyl alkylamine, ethoxylated aminopropylalkylamine, quaternized trialkylbenzylammonium salts, hydroxyethylidene diphosphonic acid (HEDP), and combinations thereof. The additive may include metal salts, particularly zinc salts, alone or preferably in combination with any of the above-referenced organic compounds.

Without intending to be bound by theory, it is believed that specific organic additives, particularly ones with a heteroatom, can form an organometallic complex, e.g., metal-ligand complex, with the Tin(II) in the stannous compound that improves corrosion resistance by facilitating formation of a protective film on the corrodible metal surface, e.g., perhaps because the organometallic complex is more surface active as compare to Tin(II) alone. The organic additive may bond to the Tin(II) via dative bonds.

In addition to improving corrosion inhibition, the synergistic additive can have characteristics such as emulsion compatibility, feedability in high TDS waters, compatibility with other treatment chemicals such as scale inhibitors, low pH, and tolerance to corrosive gases. Advantageously, formulations that include thiols, phosphonates, metal salts, and amines do not stabilize emulsions in mixed fluid systems, are readily fed into high TDS waters without precipitation and are high compatibility with other treatment chemicals such as scale inhibitors.

The corrosion inhibition treatment can use a weight ratio of the stannous compound (e.g., $SnCl_2$) to the synergistic additive that is in the range of, for example, from 20:1 to 1:20, 18:1 to 1:15, 9:1 to 1:7, from 8:1 to 1:5, from 6:1 to 1:2, and from 5:1 to 1:1. The corrosion inhibition treatment can use a molar ratio of tin (Sn) to the synergistic additive that is in the range of, for example, from 20:1 to 1:20, from 5:1 to 1:8, from 4:1 to 1:2, and from 3:1 to 1:2. In some embodiments, the corrosion inhibition treatment uses more of the stannous compound than the synergistic additive.

Where a synergistic additive is used, it can be combined with the stannous compound to provide a treatment composition that can be added to the fluid for corrosion inhibition treatment. Alternatively, the stannous compound and synergistic additive can be added to the fluid separately to treat it. If combined together in a treatment composition, the treatment composition may include the stannous compound and the synergistic additive in the weight ratios described above. The composition may be aqueous and may include a total amount of stannous compound in the range of from 1 wt. % to 30 wt. %, from 2 wt. % to 15 wt. %, and from 5 wt. % to 10 wt. %. The treatment composition may include a total amount of synergistic additive in the range of from 0.1 wt. % to 25 wt. %, from 1 wt. % to 10 wt. %, and from 2 wt. % to 8 wt. %.

The total corrosion inhibitor treatment dose in the aggressive fluid (i.e., the total amount of stannous compound plus any synergistic additive) can be in the range of from 0.5 ppm to 10,000 ppm, 0.5 ppm to 500 ppm, from 1 ppm to 200 ppm, from 2 ppm to 50 ppm, and from 5 ppm to 40 ppm.

The duration of the treatment dose in the fluid should be sufficient to form a stable protective film on at least a portion of the corrodible metal surface. By way of example, this treatment duration may be from about 1 to about 90 minutes, about 10 to about 60 minutes, about 20 minutes to about 50 minutes, or about 25 to about 35 minutes. After the treatment period, a lower dose may be used to maintain the protective film. In this regard, once a stable protective film is formed on the corrodible metal surface, it may be possible to reduce the steady state dose in the water as compared to the treatment dose, e.g., by more than 50%, more than 80%, or to even reduce it to zero until the need arises to add additional corrosion inhibitor.

Apart from the additive that has synergistic corrosion inhibition characteristics, other additives may be added to the fluid, including oxygen scavengers and $H_2S$ scavengers. $H_2S$ scavengers may include one or more of an aldehyde (such as glyoxal or formaldehyde), imine (such as MEA triazine, MMA, triazine or reaction products from an aldehyde and amine), metal salt (such as zinc octanoate) or amine (such as piperidine or ethylene diamine). These scavengers can complex with the $H_2S$ to aid in corrosion inhibition.

Table 4 shows corrosion inhibition effectiveness for stannous chloride alone and combination with several additives. The brine used in the Table 4 experiments is the same as that used in the experiments for Tables 2 and 3 above.

In a 2 liter reaction kettle, the brine was bubbled with 100% $CO_2$ for 1 hour. Using 250 ml plastic bottles, 10 ppm of hydroquinone/DEHA mixture was added to scavenge residual $O_2$, 10 ppm of product and preweighed C1010 mild steel coupons added. 200 ml of the deoxygenated brine was added to the bottle while blanketing with 100% $CO_2$. Once full, the bottle was tightly sealed. This processes was completed for all tests. Bottles were added to a rotating incubator set to 150 rpm and 40° C. for 3 days.

TABLE 4

| Example | SnCl2 (ppm) | TGA (ppm) | Ethoxylated fatty diamine (ppm) | HEDP (ppm) | Δ (g) | Corrosion Rate (mpy) | % Inhibition |
| --- | --- | --- | --- | --- | --- | --- | --- |
| Control | — | — | — | — | 0.0921 | 30.26 | 0 |
| Control | — | — | — | — | 0.0915 | 30.06 | 0.65 |

TABLE 4-continued

| Example | SnCl2 (ppm) | TGA (ppm) | Ethoxylated fatty diamine (ppm) | HEDP (ppm) | Δ (g) | Corrosion Rate (mpy) | % Inhibition |
|---|---|---|---|---|---|---|---|
| 1 | 10 | | | | 0.032 | 10.51 | 65.03 |
| 2 | | 10 | | | 0.0264 | 8.67 | 71.15 |
| 3 | | | 10 | | 0.0756 | 24.84 | 17.38 |
| 4 | 9 | 1 | | | 0.0232 | 7.62 | 74.64 |
| 5 | 7.5 | 2.5 | | | 0.0188 | 6.18 | 79.45 |
| 6 | 5 | 5 | | | 0.0213 | 7.00 | 76.72 |
| 7 | 2.5 | 7.5 | | | 0.0208 | 6.83 | 77.27 |
| 8 | 1 | 9 | | | 0.0741 | 24.34 | 19.02 |
| 9 | 9 | | 1 | | 0.0281 | 9.23 | 69.29 |
| 10 | 7.5 | | 2.5 | | 0.0262 | 8.61 | 71.37 |
| 11 | 5 | | 5 | | 0.0351 | 11.53 | 61.64 |
| 12 | 2.5 | | 7.5 | | 0.0273 | 8.97 | 70.16 |
| 13 | 1 | | 9 | | 0.0352 | 11.56 | 61.53 |
| 14 | | | | 10 | 0.0586 | 19.25 | 35.96 |
| 15 | 9 | | | 1 | 0.0171 | 5.62 | 81.31 |
| 16 | 7.5 | | | 2.5 | 0.0163 | 5.35 | 82.19 |
| 17 | 5 | | | 5 | 0.0273 | 8.97 | 70.16 |
| 18 | 2.5 | | | 7.5 | 0.0494 | 16.23 | 46.01 |
| 19 | 1 | | | 9 | 0.054 | 17.74 | 40.98 |

As can be seen by comparing Example 1 with the results in Tables 2 and 3, a stannous corrosion inhibitor alone is much more effective in preventing corrosion than conventional corrosion inhibition techniques for aggressive, high TDS fluids. The effectiveness in such aggressive fluids is surprising since Sn(II) corrosion inhibitors are typically limited to cooling water applications in low TDS waters. Additionally, as pH of a fluid decreases and the concentration of chlorides, sulfates, and calcium increase, the corrosion inhibition properties of Sn(II) based products are known to diminish.

Surprisingly, the data shows that several of these additives synergistically increase the effectiveness of the stannous corrosion inhibitor. The combination is more effective, in each case, than any of the constituent components. In this regard, Example 1 shows that a 10 ppm treatment of stannous chloride exhibits 65% corrosion inhibition. Example 14 shows that 10 ppm of HEDP exhibits 36% corrosion inhibition. It would therefore have been expected that any 10 ppm combination of these two components would have exhibited between 36-65% corrosion inhibition. However, Examples 15-17 show that certain combinations in fact achieve substantially higher corrosion inhibition than either the stannous alone or the HEDP alone. Similar behavior is observed for TGA and Ethoxylated fatty diamine).

Figure 2:
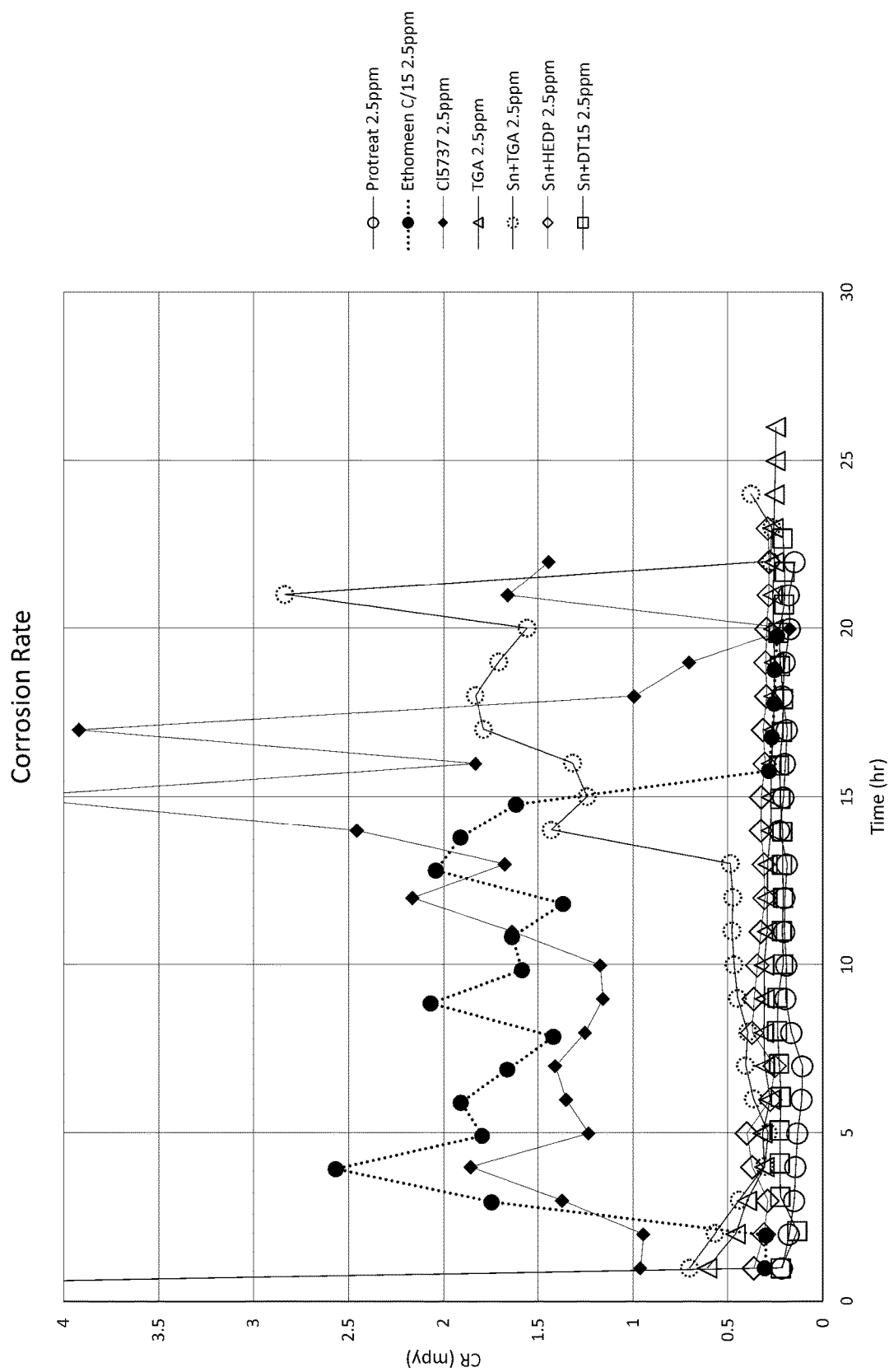
Figure 3:
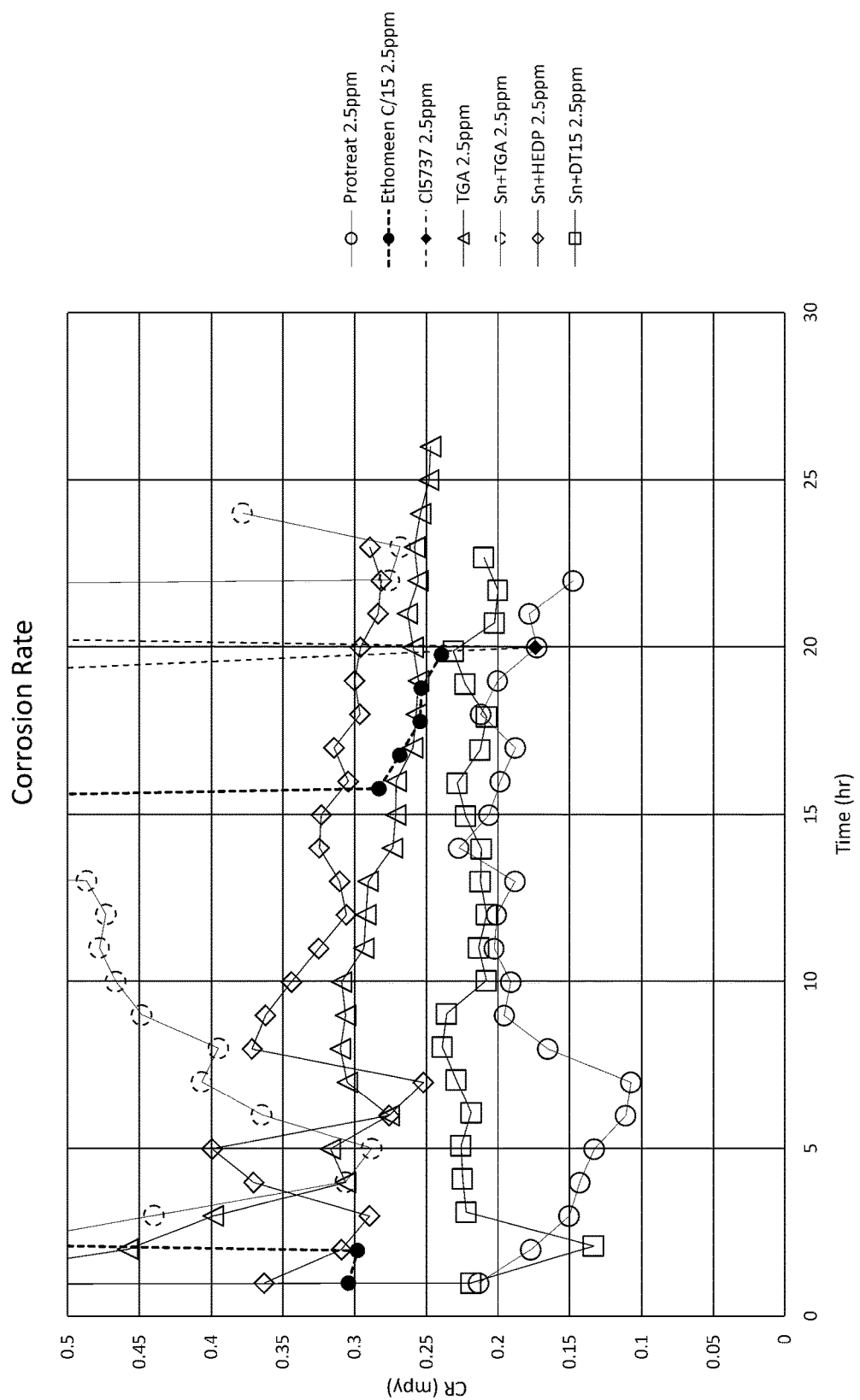

FIGS. 1-3 are graphs showing additional corrosion rate data over time for several corrosion inhibition formulations using a rotating cylinder electrode (RCE) test. The brine used in these experiments has the same composition as the brine used in the experiments of Tables 2-4, above. Brine was added to 1 liter RCE flask and bubbled with 100% $CO_2$ for 1 hour while the temperature was set to 40° C. A C1018 mild steel RCE coupon was used for these experiments. The RCE was assembled with a rotational rate of 500 rpm and utilizing linear polarization resistance to measure the corrosion rate every hour for 22-24 hours. Dosages of the corrosion treatment composition were selected so that active components were equivalent across the board (active components present at a concentration of about 2-3 ppm).

Each of FIGS. 1-3 represent the same data set, and each figure shows a respectively increasing resolution of the data for ease of comparison. The examples are added to the brine in amounts of 2.5 ppm of actives (e.g., tin chloride and/or synergistic additive). Where an additive is included (TGA, HEDP, or DT15) it is added in a 1:1 ratio with $SnCl_2$, with each therefore being present in an amount of 1.25 ppm. Also, in this data, a $SnCl_2$ formulation with 5 wt. % ethoxylated tallow diamine, and the remaining components are as described above.

As can be seen in the Figures, the treatment compositions that include only a stannous component exhibit significantly improved corrosion rates (compare SnCl2 in FIG. 2 with the control in FIG. 1), and substantial further improvements are achieved when the tin is combined with any of TGA, HEDP, and ethoxylated tallow diamine. This testing shows that stannous compounds, alone or combined with TGA, HEDP, and/or ethoxylated tallow diamine, would provide very good corrosion inhibition treatments for equipment that contacts aggressive fluids found in oilfield and other applications.

Although the preceding description has been described herein with reference to particular embodiments, it is not intended to be limited to the particulars disclosed herein; rather, it extends to functionally equivalent structures, methods and uses, such as are within the scope of the appended claims. Furthermore, although only a few example embodiments have been described in detail above, those skilled in the art will readily appreciate that many modifications are possible in the example embodiments without materially departing from the present disclosure. Accordingly, all such modifications are intended to be included within the scope of this disclosure as defined in the following claims.

What is claimed is:

1. A method of inhibiting corrosion of a corrodible metal surface that contacts a fluid having an aqueous component with a total dissolved solids content of at least 50,000 ppm, and which includes a calcium content of at least 1,000 ppm and a chloride content of greater than 10,000 ppm, the method comprising:
    adding a stannous compound and at least one organic additive to the fluid in a weight ratio of from 9:1 to 1:4, the organic additive including an ethoxylated amine that is selected from at least one of an ethoxylated aminopropylalkylamine, an ethoxylated tallow amine, and an ethoxylated tallow propylene diamine;

wherein the organic additive is effective to improve corrosion inhibition of the corrodible metal surface as compared to the stannous compound alone.

2. The method of claim 1, wherein the ethoxylated amine is an ethoxylated aminopropylalkylamine.

3. The method of claim 1, wherein the ethoxylated amine is an ethoxylated tallow amine.

4. The method of claim 1, wherein the ethoxylated amine is an ethoxylated tallow propylene diamine.

5. The method of claim 1, wherein the stannous compound and the at least one organic additive are added to the fluid in a weight ratio of from 3:1 to 1:3.

6. The method according to claim 1, wherein the organic additive is able to form an organometallic complex with the tin of the stannous compound.

7. The method according to claim 1, wherein the at least one organic additive further includes one or more compounds selected from the group consisting of thiols, phosphonates, other amines, and combinations thereof.

8. The method according to claim 1, wherein the at least one organic additive further includes one or more compounds selected from thioglycolic acid, mercaptoethanol, decanethiol, aminomethylene phosphonates, polyamino polyether methylene phosphonate (PAPEMP), hexamethylenediamine tetramethylene phosphonic acid (HDTMP), aminotrimethylenephosphonate, PBTC, DETPMP, BHMTPMP, substituted imidazoline, pyridine quat, aminopropyl alkylamine, quaternized trialkylbenzylammonium salts, hydroxyethylidene diphosphonic acid (HEDP), and combinations thereof.

9. The method according to claim 1, wherein the at least one organic additive further includes hydroxyethylidene diphosphonic acid.

10. The method according to claim 1, wherein the at least one organic additive further includes thioglycolic acid.

11. The method according to claim 1, further comprising adding a zinc salt to the fluid.

12. The method of claim 1, wherein the stannous compound is provided in a sufficient amount and for a sufficient time to form a stable protective film on at least a portion of the corrodible metal surface.

13. The method of claim 1, wherein the fluid comprises waters from mining, geothermal, oil, or gas production.

14. The method of claim 1, wherein the stannous compound and the at least one organic additive are added to the fluid in a total amount of from 0.5 ppm to 10,000 ppm.

15. The method of claim 1, wherein the stannous compound and the at least one organic additive are added to the fluid in a total amount of from 0.5 ppm to 50 ppm.

16. The method of claim 1, wherein the stannous compound and the at least one organic additive are added to the fluid in a total amount of from 1 ppm to 15 ppm.

17. The method of claim 1, wherein the stannous compound includes at least one stannous salt selected from the group consisting of stannous sulfate, stannous bromide, stannous chloride, stannous oxide, stannous phosphate, stannous pyrophosphate, stannous tetrafluoroborate, and combinations thereof.

18. The method of claim 1, wherein the aqueous component includes at least 200 ppm sulfate.

19. The method of claim 1, wherein the aqueous component includes from 5,000 ppm to 100,000 ppm of calcium, and from 50,000 ppm to 500,000 ppm of chloride.

20. The method of claim 1, wherein the aqueous component has a total dissolved solids content of from 100,000 ppm to 500,000 ppm.

21. The method of claim 1, wherein the fluid has a pH of from 2 to 6.

22. The method of claim 1, wherein the fluid has a pH of from 3 to 5.

* * * * *